United States Patent [19]

Shin

[11] Patent Number: 5,120,085
[45] Date of Patent: Jun. 9, 1992

[54] PIPE CONNECTING DEVICE

[76] Inventor: Sang Man Shin, Jindallae Apt. 1-1101, 762-1 Yeoksam-Dong, Kangnam-Ku, Seoul, Rep. of Korea

[21] Appl. No.: 586,142

[22] Filed: Sep. 21, 1990

[30] Foreign Application Priority Data

Sep. 28, 1989 [KR] Rep. of Korea ............... 89-14136
Jul. 9, 1990 [KR] Rep. of Korea ............... 90-10013

[51] Int. Cl.⁵ ............................................. F16L 39/00
[52] U.S. Cl. ................................. 285/317; 285/318; 285/319; 285/921
[58] Field of Search ............... 285/317, 277, 276, 921, 285/315, 316, 318, 319

[56] References Cited

U.S. PATENT DOCUMENTS

| 692,988 | 2/1902 | Davis | 285/276 X |
|---|---|---|---|
| 883,941 | 4/1908 | Eagan | 285/276 |
| 2,102,774 | 12/1937 | Williams | 285/317 X |
| 3,317,220 | 5/1967 | Bruning | 285/276 X |
| 3,913,954 | 10/1975 | Klimpl | 285/305 |
| 4,055,359 | 10/1977 | McWethy | 285/39 |
| 4,260,184 | 4/1981 | Greenawalt et al. | 285/305 |
| 4,278,276 | 7/1981 | Ekman | 285/49 |
| 4,647,081 | 3/1987 | Landgraf et al. | 285/317 X |

FOREIGN PATENT DOCUMENTS 484768  5/1938  United Kingdom ............... 285/315

Primary Examiner—Dave W. Arola
Attorney, Agent, or Firm—Birch, Stewart, Kolasch & Birch

[57] ABSTRACT

A pipe connecting device which comprises a socket fixed to a first pipe, a joint fixed to a second pipe, and a plurality of stopper pieces surrounded with a band spring sleeve, whereby the plurality of stopper pieces are inserted into stopper holes formed at socket, and protrusions of the stopper pieces are inserted to fixing groove of the joint, respectively, so as to be tightly coupled both pipes.

9 Claims, 7 Drawing Sheets

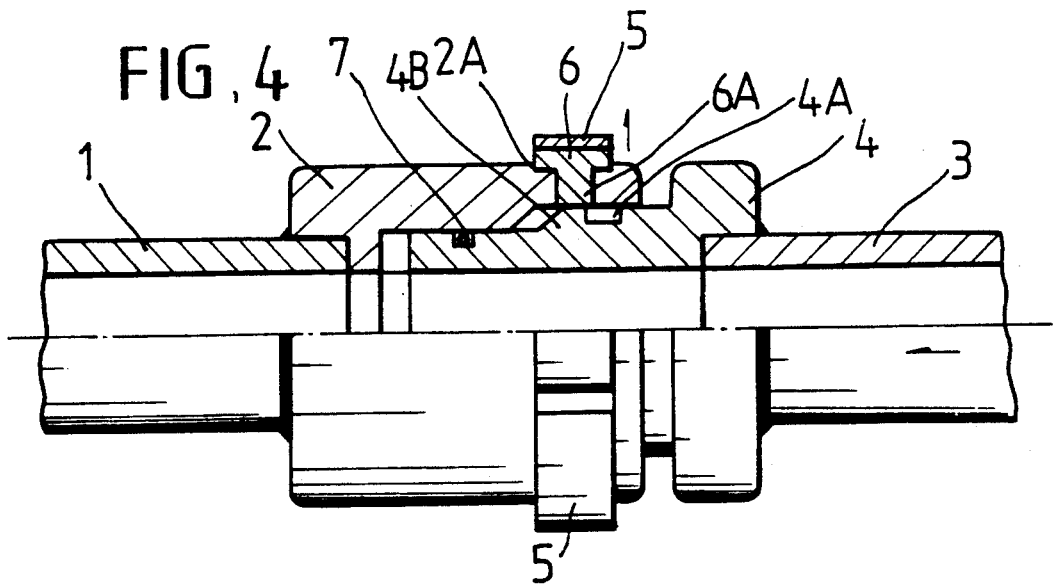
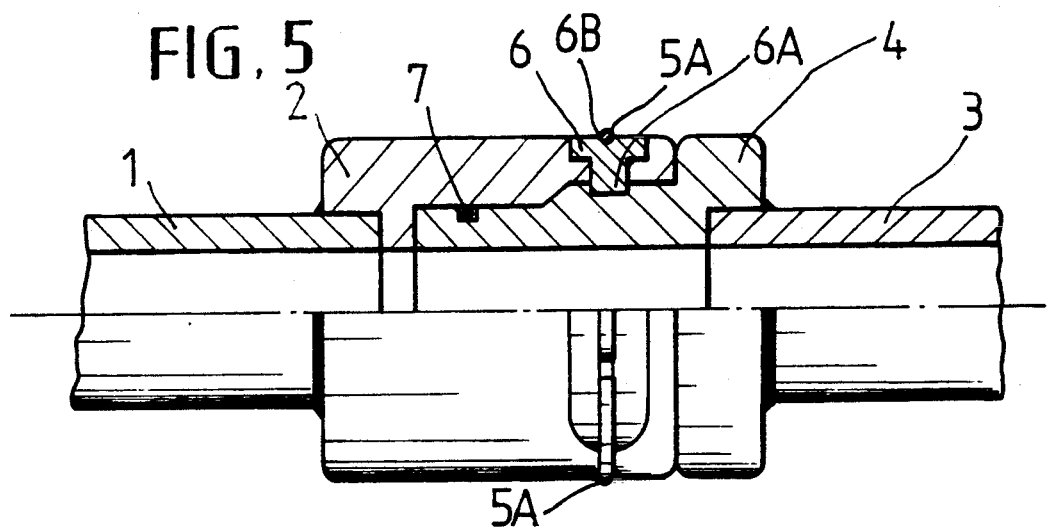
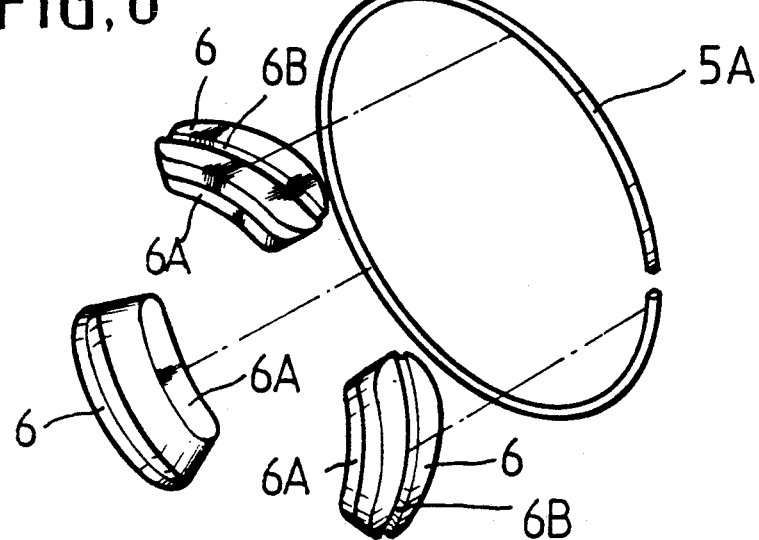

PIPE CONNECTING DEVICE

BACKGROUND OF THE INVENTION

1. Field of the Invention

The present invention relates to a pipe connecting device which is assembled with a first pipe and a second pipe at a time so that the connecting time period is shortened and also the connection of both pipes can be uniformly and surely achieved.

2. Description of the Prior Art

Generally, various types of pipe connecting devices applied for automobiles, industrial installations, home gas implements and the like, are well known in the art. Such pipe connecting devices suffer from a number of disadvantages such as, for example, the coupling time period is long and the degree of tightening is inaccurate whereby it is not coupled uniformly and surely, the surety of coupling cannot be expected, and therefore, it causes the deterioration of reliability. Such pipe connecting devices are shown in the U.S. Pat. Nos. 3,913,954, 4,055,359, 4,260,184, and 4,278,276.

SUMMARY OF THE INVENTION

Accordingly, it is an object of the present invention to provide an improved pipe connecting device.

Another object of the present invention is to provide a pipe connecting device including a plurality of stopper pieces resiliently inserted into fixing grooves of a joint by a band spring sleeve or a wire spring ring as well as a coil spring ring so that coupling time period of both pipes is shortened and the coupling can be carried out uniformly and surely.

A further object of the present invention is to provide a pipe connecting device which is simple in construction, inexpensive to manufacture, ease in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a pipe connecting device which comprises a socket fixed to a first pipe, a joint fixed to a second pipe, and a plurality of stopper pieces surrounded with a band spring sleeve, whereby the plurality of stopper pieces are inserted into stopper holes formed at the socket, and protrusions of the stopper pieces are inserted to fixing grooves of the joint, respectively, so as to be tightly coupled both pipes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a front elevational view of the device of the present invention containing cut away portions in order to illustrate the connecting state of the first embodiment of the present invention;

FIG. 5 is a front elevational view of the device of second embodiment of the present invention containing cut away portions in order to illustrate the construction of the device of the second embodiment of the present invention;

FIG. 6 is an exploded perspective view of basic elements of second embodiment of the present invention;

DESCRIPTION OF THE PREFERRED EMBODIMENTS

Figure 1:
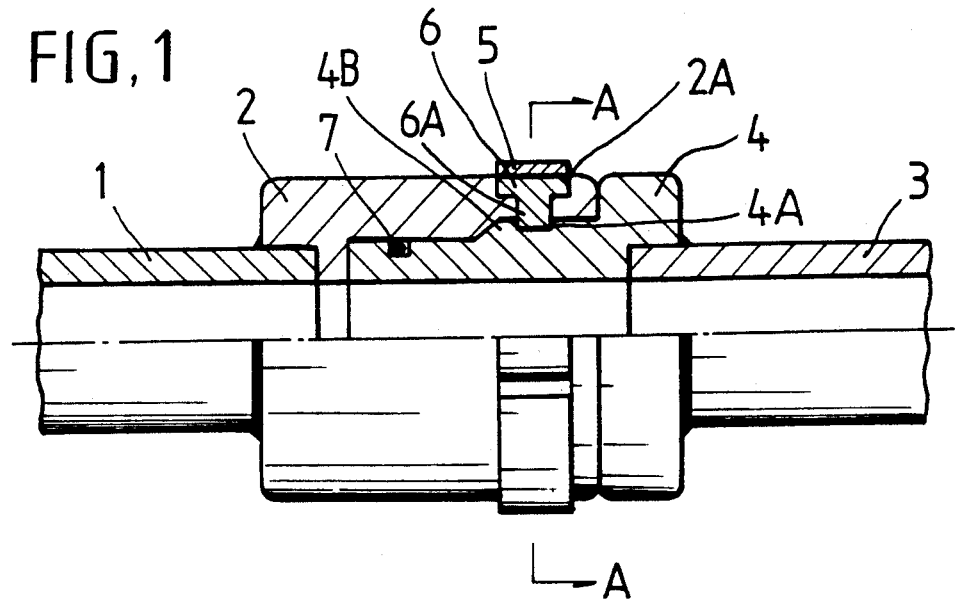
FIG. 1 is a front elevational view of the pipe connecting device of a preferred embodiment of the present invention containing cut away portions in order to illustrate the construction of the device according to the present invention.
Figure 2:
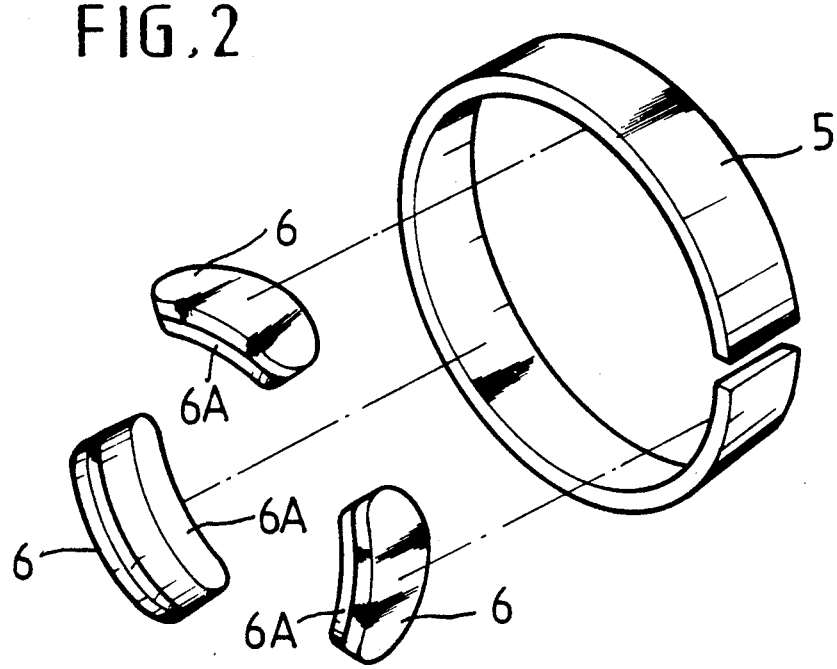
FIG. 2 is an exploded perspective view of basic elements of the device of the first embodiment of the present invention.
Figure 3:
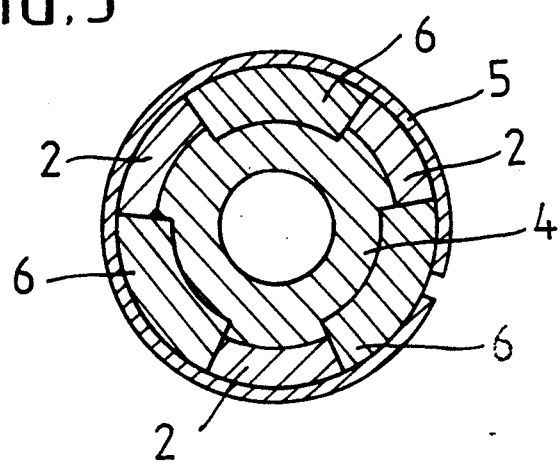
FIG. 3 is a cross-sectional view of FIG. 1, taken along line A—A.
Figure 7:
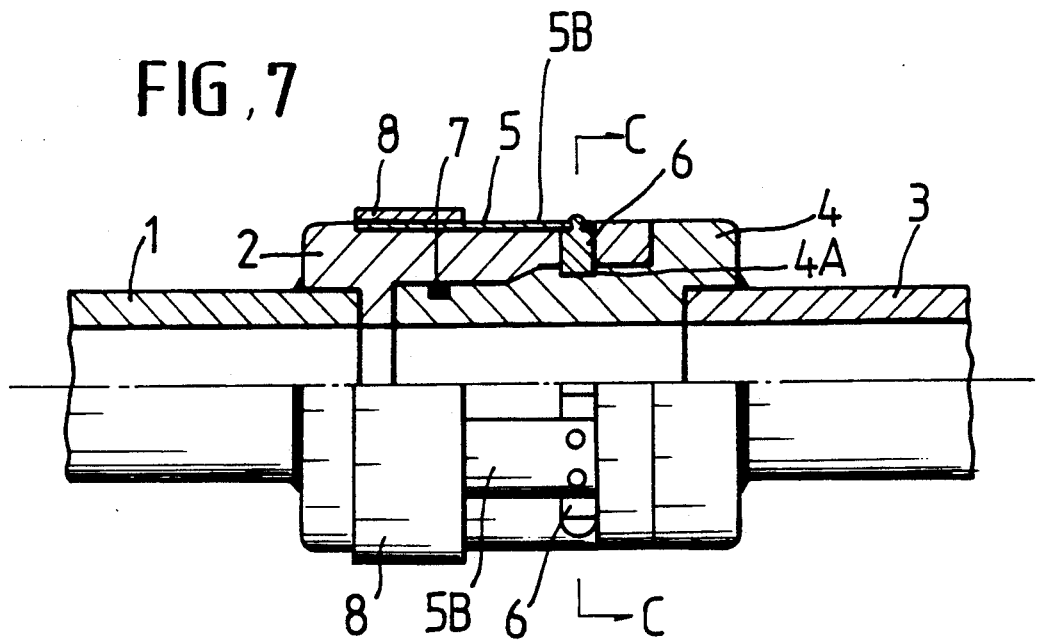
FIG. 7 is a front elevational view of the device of third embodiment of the present invention containing cut away portions in order to illustrate the construction of the device of the third embodiment of the present invention.
Figure 8:
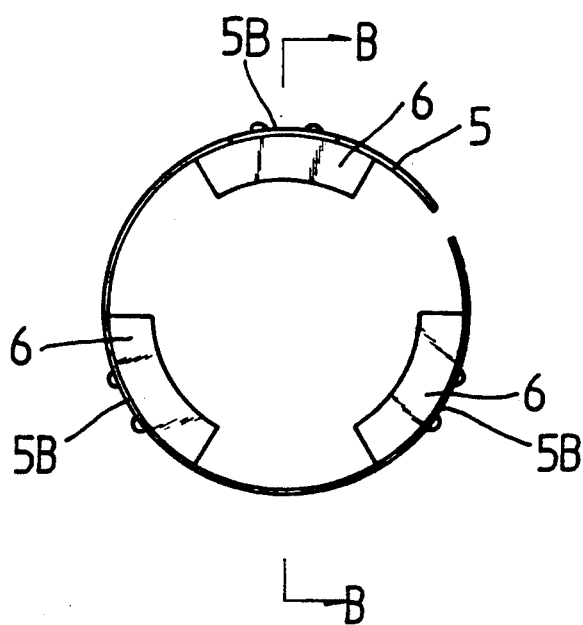
FIG. 8 is a side elevational view of the device of third embodiment of the present invention.
Figure 9:
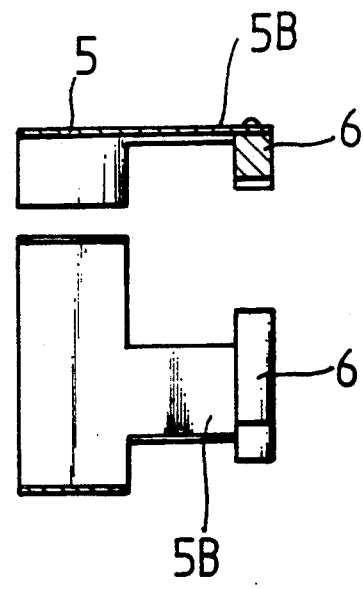
FIG. 9 is a cross-sectional view of FIG. 8, taken along line B—B.

Referring now in detail to the drawings for the purpose of illustrating preferred embodiments of the present invention, the pipe connecting device as shown in FIGS. 1, 2, and 3, comprises a socket 2 fixed to one end of a first pipe 1, a joint 4 fixed to one end of a second pipe 3, a plurality of stopper pieces 6 disposed around the joint 4 and inserted into a plurality of stopper holes 2A which is formed at a predetermined position of one end of the socket 2 for slidably receiving the plurality of stopper pieces 6, and a band spring sleeve 5 for resiliently surrounding the plurality of stopper pieces 6. Each stopper piece 6 has an arc-shaped configuration to form a T-shaped configuration and provided with an extension 6A inserted into fixing groove 4A of the joint 4 which includes a raised portion 4B and an O-ring 4A.

FIG. 5 and 6 show the second embodiment of the present invention, wherein a wire spring ring 5A is used instead of the band spring sleeve 5 of the first embodiment of the present invention. Each stopper piece 6 is provided with a stopper channel 6B disposed at a circumferential surface thereof for tightly receiving the wire spring ring 5A.

FIGS. 7 to 11 show the third embodiment of the present invention, in this case, it is applied by coupling the band spring sleeve 5 and the plurality of stopper pieces 6. Each stopper pieces 6 is fixed to a connecting portion 5B disposed one end of the band spring sleeve and inserted into the stopper holes 2A of the socket 2 for fixing a groove 4A of the joint 4. The plurality of stopper piece 6 are attached to the inner surface of the band spring 5 by securing means such as bolts, strong adhesives, and the like. Also the other end of the band spring sleeve 5 is surrounded with a rubber band 8 at external circumference thereof.

FIGS. 12 to 18 show the fourth embodiment of the present invention, in which the plurality of stopper holes 2A disposed at one end of the socket 2 and disposed in opposite side of the first pipe 1 has a T-shaped configuration. Each stopper piece 6 having the stopper channel 6B is inserted into the stopper hole 2A and a socket channel 2B formed at a circumferential surface of the socket 2. A coil spring 9 is alternatively inserted into the plurality of stopper channels 6B of the stopper pieces 6 and the plurality of socket channels 2 and thereafter, a dust cover 10 is covered to the dust cover groove 2C formed at one end of the socket 2 for preventing the coil spring 9 from slipping from the channels 2B and 6b to the outside thereof. A hooking protrusion 3A extending from the second pipe 3 for forming a recess is hooked to the extension 6A of the stopper piece 6. The dust cover 10 is made of rubber, silicon material, and the like.

The pipe connecting device according to the present invention operates as follows.

As shown in FIG. 4, when the plurality of stopper pieces 6 with the extension 6A are slidably inserted into the plurality of stopper holes 2A and then the plurality of stopper pieces 6 inserted into the plurality of stopper holes 6A are surrounded by the band sleeve 5 the socket 2 fixed with the first pipe 1 is coupled with the joint 4 of the second pipe 3, the plurality of stopper pieces 6 are outwardly widened by the raised portion 4B of the joint 4. At this time, the plurality of stopper pieces 6A become resiliently to widen since the band spring sleeve 5 is surrounded along the circumferential surface of the stopper pieces 6. Thereafter, when the extensions 6A of the stopper pieces 6 are inserted to the fixing grooves 4A of the joint 4, respectively, and since the stopper pieces 6 are resiliently pressed by the band spring sleeve 5, the socket 2 and joint 4 are tightly coupled together by the stopper pieces 6. That is, the first pipe 1 is tightly coupled with the second pipe 3.

Accordingly, the connection of both first and second pipes 1 and 3 is simple, and the connecting time period can be greatly shortened and particularly, the problem of uncertainty of more or less tightening according to the conventional screw tightening is excluded, whereby both pipes 1 and 3 can be connected surely and uniformly.

In second embodiment of the present invention, the wire spring ring 5A is utilized instead of the band spring sleeve 5 of the first embodiment of the present invention, in which the wire spring ring 5A is inserted into the stopper channel 6B of the stopper pieces 6 so that the plurality of stopper pieces 6 are resiliently mounted, whereby the first pipe 1 and the second pipe 2 can be uniformly and surely connected (FIGS. 5 and 6).

Figure 10:
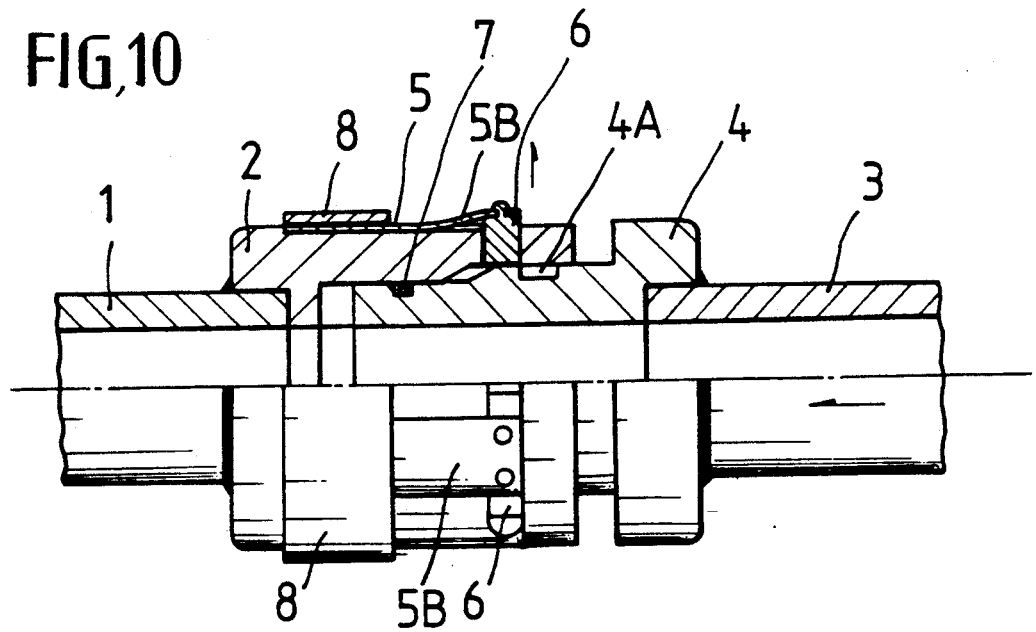
FIG. 10 is a front elevational view of the device of the present invention containing cut away portions in order to illustrate the connecting state of the third embodiment of the present invention.
Figure 11:
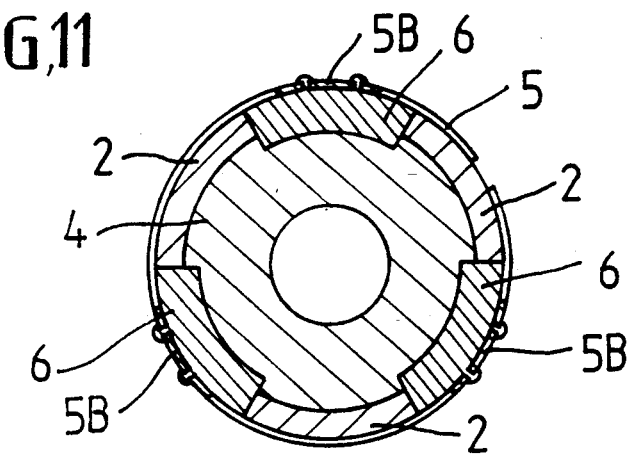
FIG. 11 is a cross-sectional view of FIG. 7, taken along line C—C.
Figure 12:
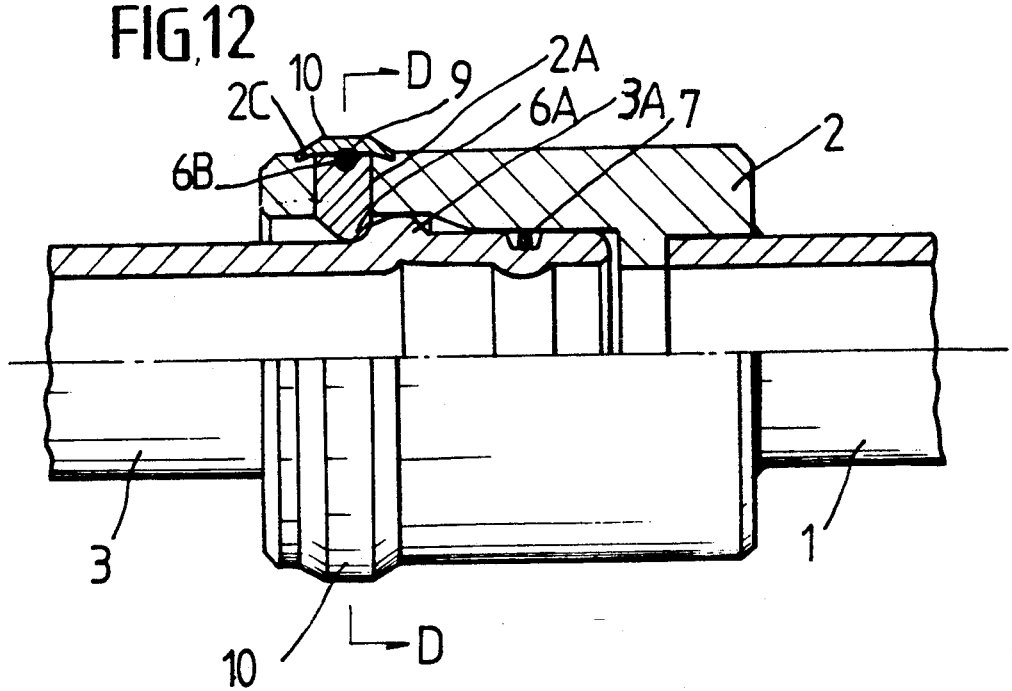
FIG. 12 is a front elevational view of the device of fourth embodiment of the present invention containing cut away portions in order to illustrate the construction of the device of the fourth embodiment of the present invention.
Figure 13:
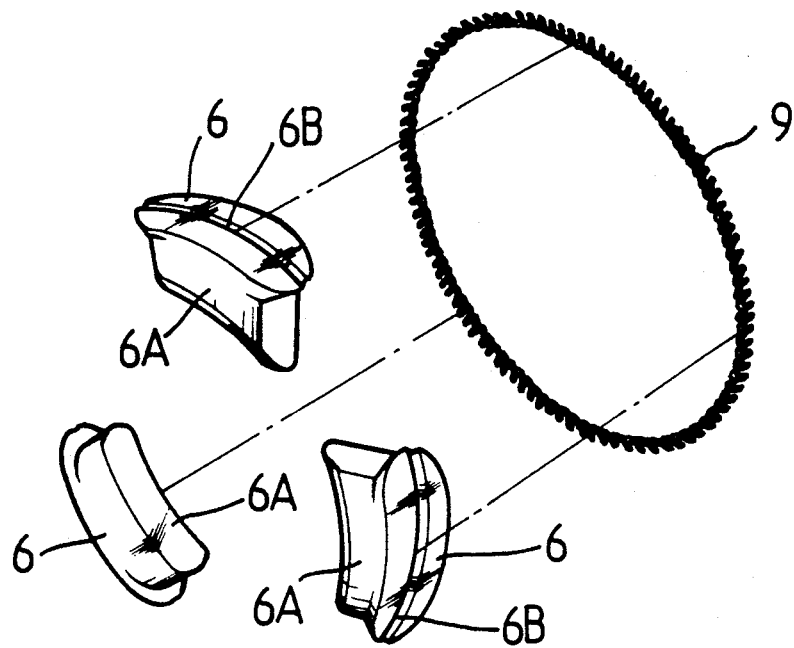
FIG. 13 is an exploded perspective view of basic elements of the fourth embodiment of the present invention
Figure 14:
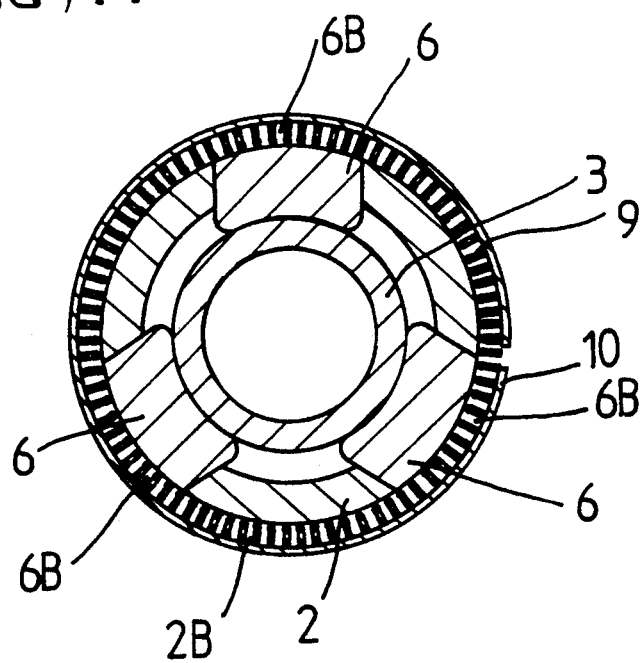
FIG. 14 is a cross-sectional view of FIG. 12, taken along line D—D.
Figure 15:
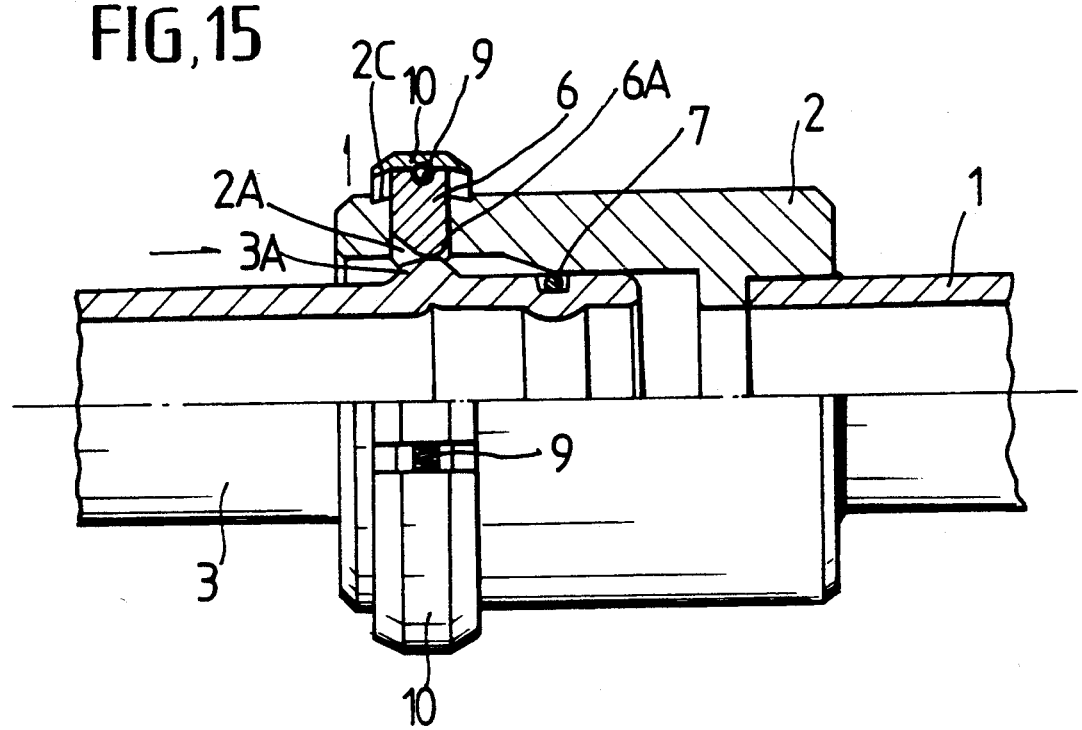
FIG. 15 is a front elevational view of the device of the present invention containing cut away portions in order to illustrate the connecting state of the fourth embodiment of the present invention.
Figure 16:
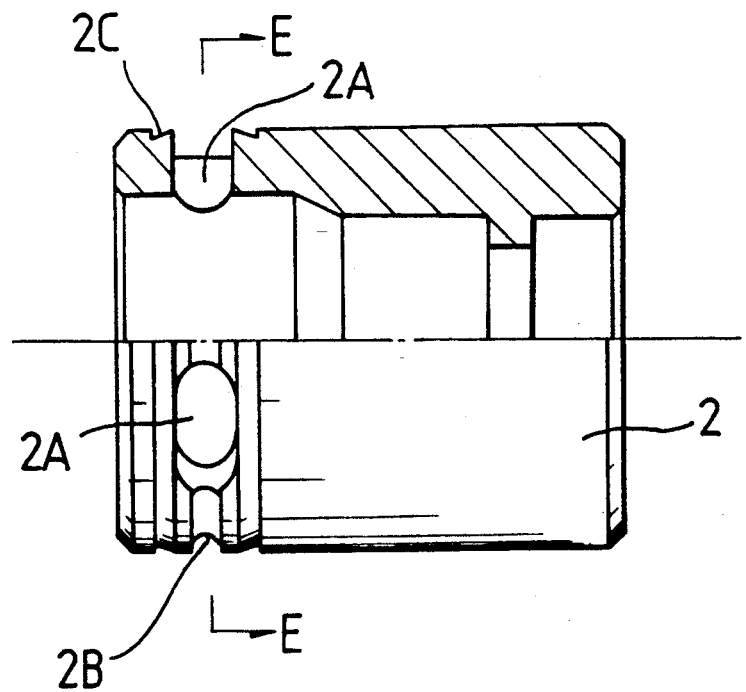
FIG. 16 is a front elevational view of a socket according to the present invention containing cut away portions in order to illustrate the construction of a socket according to the fourth embodiment of the present invention.
Figure 17:
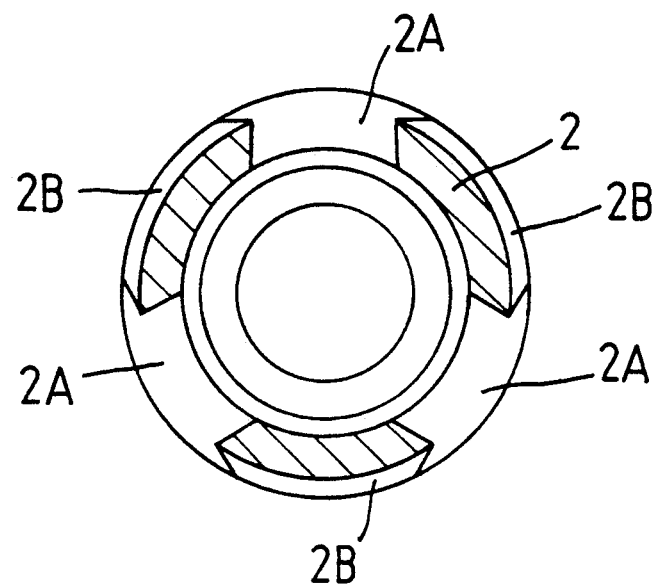
FIG. 17 is a cross-sectional view of FIG. 16, taken along line E—E.
Figure 18:
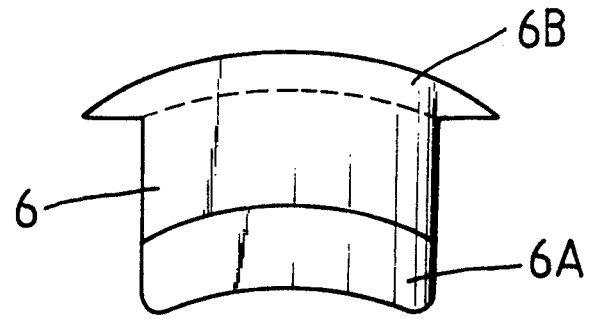
FIG. 18 is a front elevational view of a plurality of stopper pieces according to the fourth embodiment of the present invention.

In third embodiment as shown in FIGS. 7 to 11, the band spring sleeve 5 and the stopper pieces 6 are coupled together as a composite structure so as to be used as a sealing member. When the socket 2 and the joint 4 fixed to pipes 1 and 2, respectively, are coupled to each other through the connecting device as shown in FIG. 10, the plurality of stopper pieces 6 are outwardly widened to by the raised portion 4B of the joint 4. Since the band spring sleeve 5 is fixed to the stopper pieces 6 and the other side of the band spring sleeve 5 is surrounded by the rubber band 7, the band spring sleeve 5 is resiliently widened. Thereafter, the extension 6A of the stopper pieces 6 are inserted into the fixing grooves 4A of the joint 4. Also, since the stopper pieces 6 are resiliently pressed by the band spring sleeve 5, both first and second pipes 1 and 3 can be tightly coupled together.

In fourth embodiment of the present invention as shown in FIGS. 12 to 18, the coil spring ring 9 is used instead of the band spring sleeve 5 or the wire spring ring 5 of the first and second embodiment of the present invention. The dust cover 10 made of rubber or silicon material prevents the coil spring 9 from separating from the socket channels 2B and stopper channels 6B so that the first pipe 1 and the second pie 3 are tightly coupled together and since the dust cover 10 prevents foreign substances such as dust from entering into the stopper hole 2A inserted with the stopper pieces 6 for maintaining it in a clean condition. Also, the plurality of stopper pieces 6 are resiliently pressed by the coil spring ring 9 and the dust cover 10. When the annular hooking protrusion 3A of the second pipe 3 presses the extension 6A of stopper pieces 6 and thereby being hooked up to the extension 6A of the stopper pieces 6, the first pipe 1 and the second pipe 3 are coupled together, whereby the coupling time period of both first and second pipes 1 and 3 is reduced and they are uniformly and surely coupled since the stopper piece holes 2A has the T-shaped configuration so as to be easy and simple to construct and inexpensive to manufacture.

According to the present invention, the stopper pieces 6 are resiliently pressed by the band spring sleeve 5, the wire spring ring 5A, or the coil spring ring 9 so that the connection of both first and second pipes 1 and 3 can be carried out uniformly and surely.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A pipe connecting device comprising:
a plurality of arc-shaped configured stopping members including an extension so as to have a T-shaped configuration, respectively, a socket fixed to a first pipe, said socket including a plurality of holes for movably receiving said plurality of stopping members a joint fixed to a second pipe, said joint including a raised proportion with a plurality of grooves disposed on the outer surface thereof for slidably receiving the extension of the plurality of stopping members, and a circular leaf spring having an opening for resiliently surrounding said plurality of stopping members inserted into said grooves through said plurality of holes, whereby after the leaf spring surrounds along the plurality of the stopping member inserted into the holes of the socket fixed to the first pipe, when the socket is pushed toward the joint fixed to the second pipe, the plurality of stopping members are slidably moved out along the raised portion of the joint and thereafter, the extensions of the stopping members are inserted into the plurality of grooves of the joint, respectively, so that the first and the second pipes are effectively coupled together.

2. The pipe connecting device of claim 1, wherein the leaf spring is a wire spring.

3. The pipe connecting device of claim 2, wherein the plurality of stopping members further includes a stopping member channel disposed on the top thereof for tightly receiving the wire spring, respectively.

4. A pipe connecting device comprising:
a circular band sleeve having an opening;
a plurality of arc-shaped configured stopping members attached to the inner surface of one end portion of said band sleeve;
a socket fixed to a first pipe, said socket including a plurality of holes for movably receiving the plurality of stopping members,
a joint fixed to a second pipe, said joint including a raised portion with a plurality of grooves disposed on the outer surface thereof for slidably receiving the plurality of stopping members, and
a rubber band for resiliently surrounding the other end portion of said band sleeve, whereby after the plurality of stopping members attached to the band sleeve are inserted into the holes of the socket fixed to the first pipe, when the socket is pushed toward the joint to the second pipe, the plurality of stopping members are slidably moved out along the raised portion of the joint and thereafter, the stopping members are inserted into the plurality of grooves of the joint, respectively, so that the first pipe and the second pipe are effectively coupled together.

5. The pipe connecting device of claim 4, wherein the plurality of stopping members are attached to the band sleeve by bolts.

6. A pipe connecting device comprising:
a circular coil spring,
a plurality of arc-shaped configured stopping members including an extension forming a protrusion on the bottom thereof so as to leave a T-shaped configuration and a stopping member channel disposed on the top thereof for slidably receiving the coil spring,
a socket fixed to a first pipe, said socket including a plurality of T-shaped holes for movably receiving the plurality of stopping members and a plurality of socket channels for slidable, alternatively receiving the coil spring with the stopping member channels,
a recess formed on the outer surface of the end proportion of a second pipe for slidably receiving the protrusions of the stopping members,
a dust cover for covering the T-shaped holes so as to prevent the coil spring from separating therefrom and dust from entering there into, whereby the coil spring is alternatively inserted into the stopping member channels of the plurality of stopping members and the socket channels of the socket and thereafter, the dust cover is positioned over the T-shaped holes, coil spring and stopping members so that the first pipe and the second pipe are effectively coupled together.

7. The pipe connecting device of claim 6, wherein the recess is formed by an annular raised ring disposed at the outer surface of the end portion of the second pipe.

8. The pipe connecting device of claim 6, wherein the dust cover is made of rubber.

9. The pipe connecting device of claim 6, wherein the dust cover is made of silicon material.

* * * * *